United States Patent [19]

Lee

[11] Patent Number: 5,303,304
[45] Date of Patent: Apr. 12, 1994

[54] CAMCORDER HAVING LOUDSPEAKER FUNCTION

[75] Inventor: Sang J. Lee, Kyungki-do, Rep. of Korea

[73] Assignee: Gold Star Co., Ltd., Seoul, Rep. of Korea

[21] Appl. No.: 996,839

[22] Filed: Dec. 23, 1992

Related U.S. Application Data

[63] Continuation of Ser. No. 699,187, May 13, 1991, abandoned.

[30] Foreign Application Priority Data

May 14, 1990 [KR] Rep. of Korea ............... 6353/1990

[51] Int. Cl.⁵ .................. H04R 5/00; H04R 1/02; H04R 25/00; H04N 5/225
[52] U.S. Cl. ................... 381/26; 381/169; 381/91; 358/906
[58] Field of Search ............ 381/26, 75, 91, 169; 360/10.1, 33.1, 61; 358/906, 909

[56] References Cited

U.S. PATENT DOCUMENTS

| | | | |
|---|---|---|---|
| 3,839,733 | 10/1974 | Schechter | 360/80 |
| 4,420,777 | 12/1983 | Furuta | 360/61 |
| 4,504,874 | 3/1985 | Imai | 360/66 |
| 4,605,975 | 8/1986 | Beaman | 360/61 |
| 4,646,172 | 2/1987 | Lemelson | 360/33.1 |
| 4,764,817 | 8/1988 | Blazek et al. | 358/906 |
| 4,819,101 | 4/1989 | Lemelson | 360/10.1 |
| 4,862,278 | 8/1989 | Dann et al. | 358/906 |

Primary Examiner—James L. Dwyer
Assistant Examiner—Jack Chiang
Attorney, Agent, or Firm—Fish & Richardson

[57] ABSTRACT

A camcorder having a loudspeaker function has a recording device and includes an input device for receiving an external sound and converting it into a first electric signal and for receiving a sound from a user and converting it into a second electrical signal. The input device is preferably movable between an extended position and a retracted position. Sound processing means are provided and coupled to a speaker for outputting an amplified sound through the speaker. A switching device is provided for sending the first electrical signal to the recording device when the second input device is in the retracted position and for sending the second electrical signal to the sound processing device when the second input device is in the extended position.

8 Claims, 3 Drawing Sheets

CAMCORDER HAVING LOUDSPEAKER FUNCTION

This application is a file wrapper continuation of U.S. application Ser. No. 07/699,187, filed May 13, 1991, now abandoned.

BACKGROUND OF THE INVENTION

1. Field of the Invention

The present invention relates to a camcorder, i.e., a video camera integrally incorporating a video cassette recorder (VCR). More particularly, the present invention relates to a camcorder having a loudspeaker function.

2. Description of the Prior Art

In the past, there has been commonly used a camcorder comprising only a simple microphone for receiving an external sound to enable to record it on a video tape through sound recording means arranged in the camcorder when taking a picture thereby. In such a camcorder having the microphone provided only for a recording of the sound, a photographer must communicate with an actor or a person to be photographed by his live voice, if necessary. The prior camcorder is therefore disadvantageous in that when taking a picture at great distance or in a crowded place, the photographer must shout to the actor in order to send his message to the actor.

SUMMARY OF THE INVENTION

In view of the aforesaid problem of the prior art, it is an object of the present invention to provide a camcorder having a folded and unfolded microphone mounted for movement in one side of a body of the camcorder and additionally including a loudspeaker function, thus enabling a photographer to communicate with an actor or a person to be photographed by the speaker when taking a picture.

To achieve the above object, there is provided according to one aspect of the present invention a camcorder being a video camera integrally incorporating a video cassette recording function, and comprising input means for receiving an external sound and converting it into an electric signal, sound processing means coupled to a speaker and outputting an amplified sound through the speaker, and switching means actuated to selectively send the input sound signal to the sound processing means or to the recording means of the camcorder, thereby amplifying and transmitting a voice message of a photographer or a director or effecting a tape recording operation by the recording means.

According to another aspect of the present invention, there is provided a camcorder according to the above aspect, wherein the sound input means comprises a microphone which may be folded and adjusted in position, and in order to effect folding and position adjusting operations of the microphone, the camcorder comprises a recess formed in one side surface of a body of the camcorder for receiving the microphone therein, a guide rail secured to one side of the recess, a slider having a semicircular support plate with a central boss and slidably movable along the guide rail, and a microphone support piece holding for rotation the microphone and rotatably mounted on the central boss of the support plate.

BRIEF DESCRIPTION OF THE DRAWINGS

Many other advantages and features of the present invention will become apparent from the following description of a preferred embodiment of the invention with reference to the accompanying drawings, in which.

DESCRIPTION OF THE PREFERRED EMBODIMENT

Figure 1:
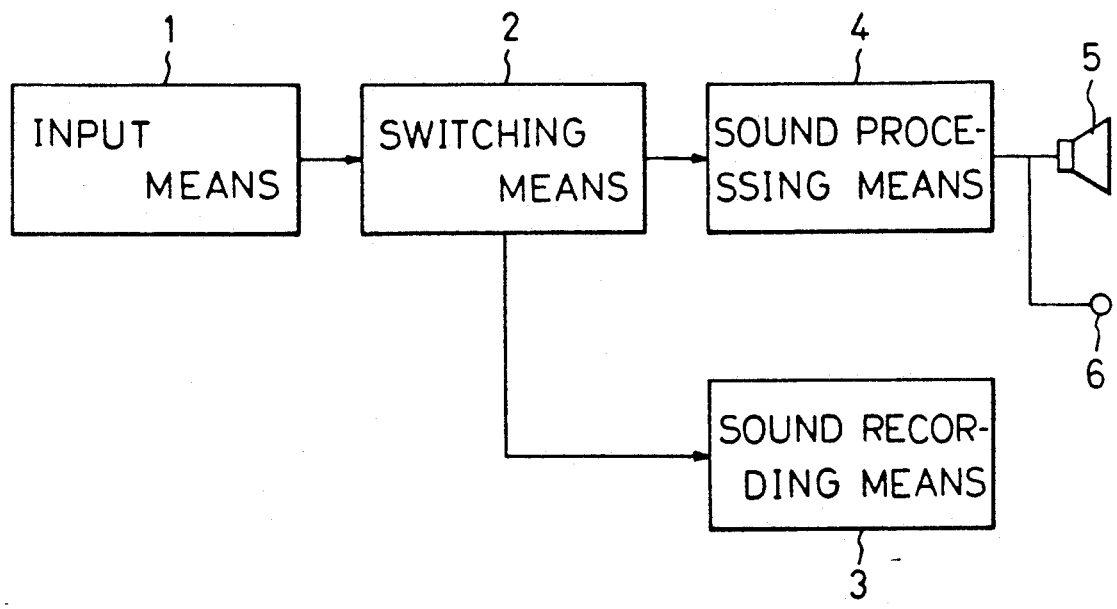
FIG. 1 is a block diagram illustrating the construction of the present invention.

Referring first to FIG. 1, there is shown a block diagram of the preferred embodiment of the present invention in which input means(1), such as a microphone, receives an external sound and converts it into an electric signal, and then, the electric signal is selectively sent by an operation of switching means(2) to sound recording means(3) which functions to record the sound on a video tape, or to sound processing means (4) which functions to amplify the sound and send the amplified sound to a speaker(5) and a speaker jack(6) for an extra speaker to transmit it to the exterior. The speaker(5) and the speaker jack(6) are coupled to the sound processing means(4) in parallel with each other in such a manner that the speaker jack (6) also serves as a switch for turning off the speaker(5) built in a camcorder when the extra speaker is connected to the camcorder through the jack, and turning on the speaker(5) when the extra speaker is disconnected from the camcorder.

Figure 2:
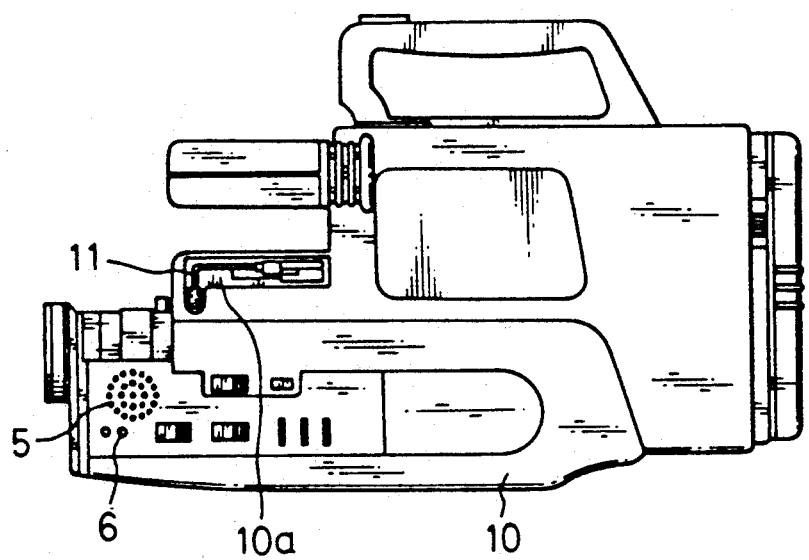
FIG. 2 is a side elevational view of a camcorder embodying the present invention.

FIG. 2 shows the camcorder according to the present invention having the components as shown in FIG. 1 arranged in its body(10). A microphone(11) is foldably mounted as input means in a recess(10a) formed in one side surface of the body(10), and the built-in speaker(5) and the speaker jack(6) for a separate speaker are disposed at appropriate positions of the body(10). Therefore, the photographer's voice input through the microphone(11) may be amplified and then transmitted to the exterior either through the built-in speaker(5) or the separate speaker connected to the camcorder through the jack(6). At this time, the sound input through the microphone(11) is selectively sent by a switching operation of the switching means to the speaker(5) via the sound processing means, or to the sound recording means within the body(10) to be recorded on a video tape. More particularly, the microphone(11) is of a right-angled shape and so arranged that it may be inserted into and taken out from the recess(10a) of the body(10) and also adjusted in position according to positions of the photographer's mouth.

Figure 3:
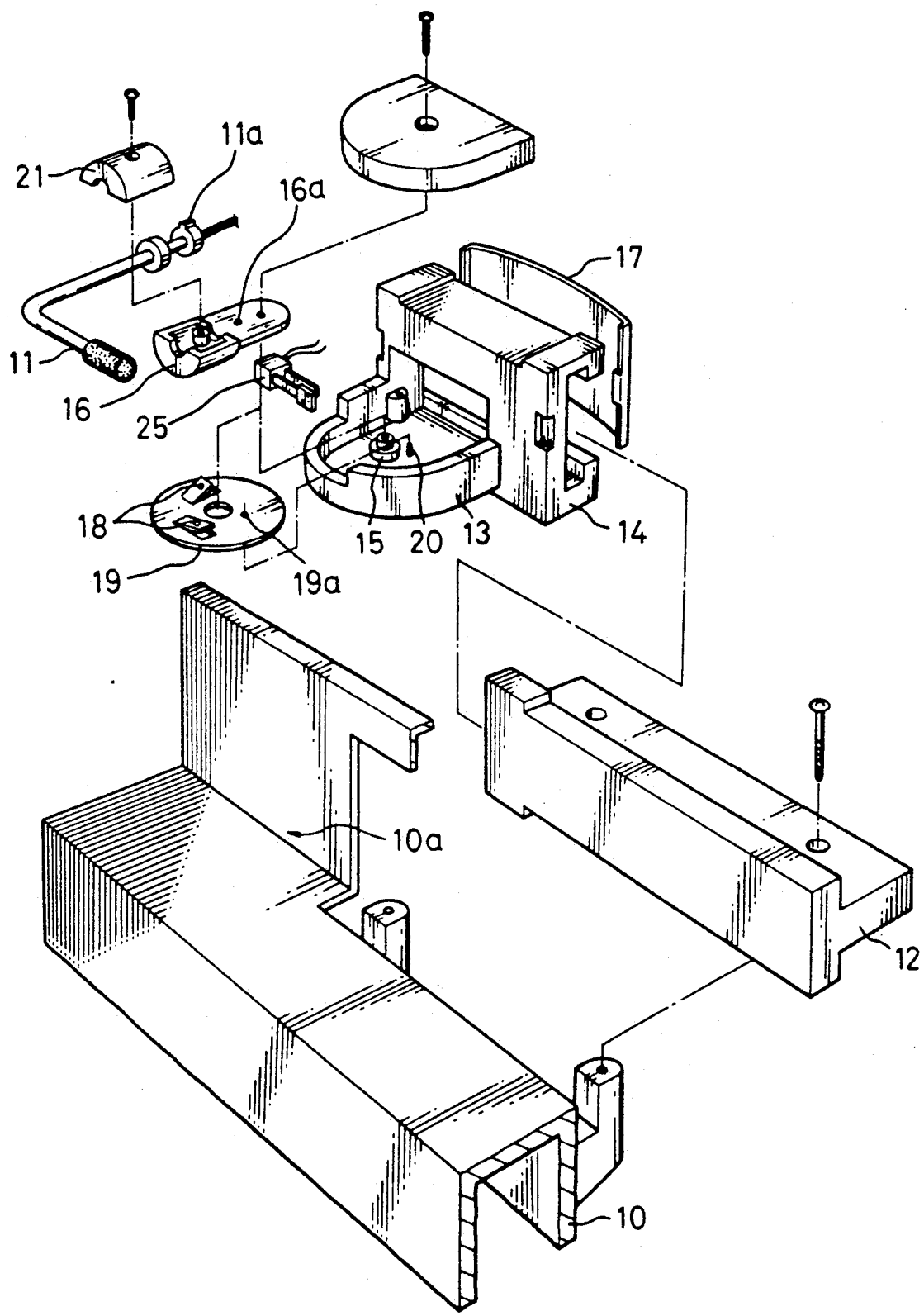
FIG. 3 is an exploded perspective view of a microphone position adjusting device according to the present invention.

FIG. 3 shows the arrangement for adjusting a position of the microphone, which comprises a T-shaped guide rail(12) fixedly secured to one side of the recess(10a) formed in one side surface of the body(10) for receiving the microphone(11), a slider(14) having a semicircular support plate(13) with a central boss(15) and slidably engaged with the guide rail(12), and a microphone support piece(16) having an engaging hole or groove(16a) and rotatably mounted on the central boss(15) of the support plate(13). In addition, a resilient leaf spring(17) is interposed between the guide rail(12) and the slider(14), and a circular plate(19) having a central hole and a plurality of engaging projections(18) is mounted on the central boss(15) of the support plate (13) below the microphone support piece(16). As a result, frictional contact between the guide rail(12) and the leaf spring(17) secured to the back side of the slider(14) and an engagement of the projection(18) of the circular plate(19) with the engaging groove(16a) of the microphone support piece(16) cause the microphone to be movable without rocking and stably held in a specific desired position.

The circular plate(19) mounted on the central boss(15) of the support plate(13) is fixedly secured to the support plate(13) by a screw fastened through a hole(19a) of the circular plate to another boss(20) of the support plate, whereby the circular plate is prevented from turning along with the microphone support piece(16) during rotation of the support piece. Then, a cover(21) is mounted on the top of the microphone support piece(16) with a guide rod(11a) of the microphone(11) rotatably disposed between the support piece(16) and the cover(21).

Figure 4:
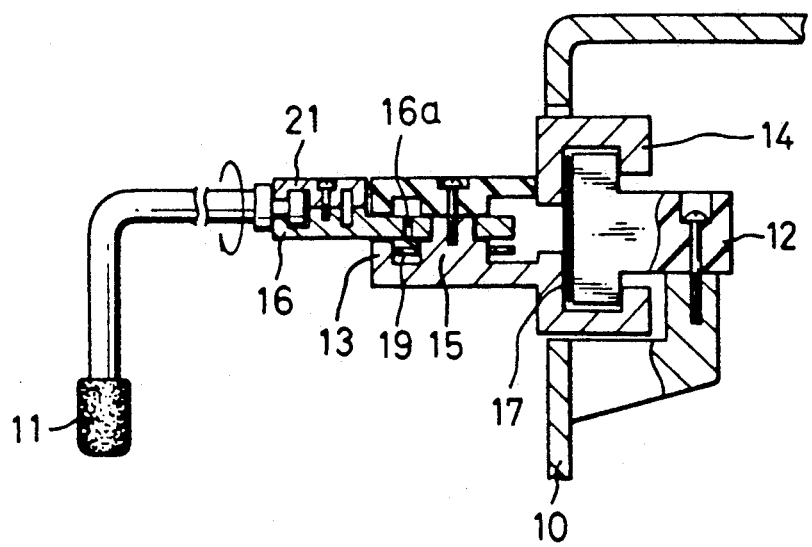
FIG. 4 is a sectional view of the device of FIG. 3 in the assembled position.

The various elements of the microphone position adjusting device as described above is assembled as shown in FIG. 4.

Use of the microphone will now be described. First, during carry and storage of the camcorder, the microphone(11) is folded or inserted into the recess(10a) of the body(10) of the camcorder, as shown in FIG. 2. In this state, when taking a picture, the user takes out the microphone from the recess(10a) and positions it at a convenient position near his mouth. The positioning of the microphone(11) is carried out by moving it in the horizontal direction by the slider(14) sliding along the guide rail(12), and rotating it by turning the microphone support piece(16) about the central boss(15) of the support plate(13) to determine an angular position of the microphone. Then, the microphone(11) of a right-angled shape may be adjusted in position to be located near photographer's mouth regardless of a personal shape of the photographer by rotating the microphone itself between the microphone support piece(16) and the cover(21). When the position adjustment of the microphone has been complated, the microphone is held in a fixed position by resiliency of the leaf spring (17) interposed between the guide rail(12) and the slider(14) and an engagement of the projection(18) of the circular plate(19) with the engaging groove(16a) of the microphone support piece(16), as described previously.

Figure 5:
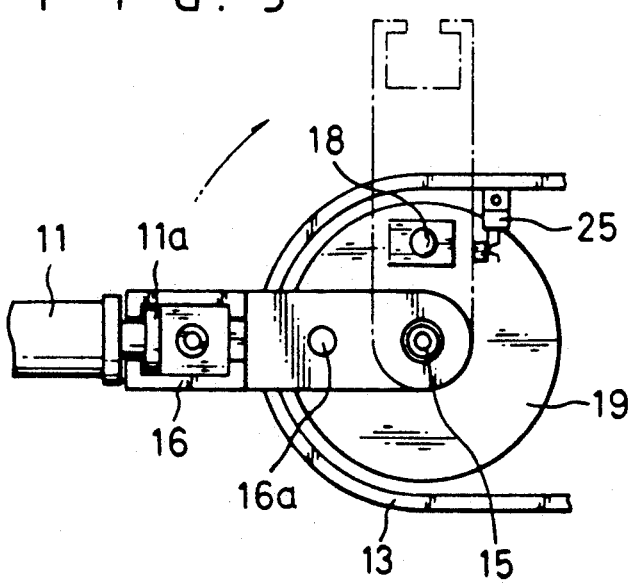
FIG. 5 is a fragmentary plan view of the device shown in FIG. 4.

In addition, as shown in FIGS. 3 and 5, a contact switch(25) is disposed as the switching means within the support plate(13) of the microphone position adjusting mechanism to carry out a switching operation according to the positions of the microphone(11) taken out from and withdrawn into the recess(10a) of the body(10) of the camcorder, without need of a separate external switch. More particularly, the contact switch(25) is mounted within the support plate(13) at a position conforming to the position of the microphone completely withdrawn into the recess(10a) of the body(10). Therefore, the switch is turned off in the condition wherein the microphone(11) has been taken out from the recess(10a) as indicated by the solid line in FIG. 5, and turned on in the condition wherein the microphone has been inserted into the recess(10a) as indicated by the dotted-and-dashed line in FIG. 5. Thus, when the switch(25) is turned on by the microphone withdrawn into the recess, a sound is recorded on the video tape in the camcorder along the route comprising the input means(10) and the sound recording means(3) of FIG. 1. To the contrary, when the switch(25) is turned off, a sound is amplified and transmitted to the exterior through the route comprising the input means(1), the sound processing means(4) and the speaker(5) of FIG. 1.

As discussed above, the present invention provides an efficient camcorder which may selectively effect a sound amplifying function enabling the photographer to easily communicate with the actor or the person to be photographed when taking a picture at great distance or in a crowded place, and its own tape recording function by changing a position of the microphone.

What is claimed is:

1. A camcorder having a recording device, comprising:
    input means for receiving a first external sound when in a first position and coverting said first external sound into a first electrical signal, and for receiving a second external sound when in a second position and converting said second external sound into a second electrical signal;
    sound processing means coupled to a speaker for amplifying a signal applied to an input thereof and outputting the amplified signal through said speaker; and
    switching means operatively connected to the input means for sending said first electrical signal to the recording device when the input means is in the first position and for sending said second electrical signal to the input of the sound processing means when the input means is in the second position.

2. A camcorder as claimed in claim 1, wherein said first position is a retracted position and said second position is an extended position.

3. A camcorder as claimed in claim 1, further comprising a speaker terminal coupled to said sound processing means in parallel with said speaker and adapted to connect with a separate external speaker.

4. A camcorder having a recording device, comprising:
    input means for receiving an external sound and converting it into an electric signal;
    sound processing means coupled to a speaker for outputting an amplified sound through said speaker; and
    switching means for selectively sending the electric signal to said sound processing means or to the recording device;
    wherein said input means comprises a foldable and adjustable microphone, and wherein the camcorder further comprises a recess formed in one side surface of a body of the camcorder for receiving the microphone therein, a guide rail secured to one side of side recess, a slider having a semicircular support plate with a central boss, said slider being slidably movable along said guide rail, and a microphone support piece rotatably mounted on said central boss of said support plate for rotatably supporting the microphone.

5. A camcorder as claimed in claim 4, wherein a leaf spring is interposed between said guide rail and said slider to cause said slider to be movable without rocking.

6. A camcorder as claimed in claim 4, wherein a circular plate having a central hole and a plurality of engaging projections is mounted on said central boss of said support plate below said microphone support piece, and said support piece is formed with an engaging groove which is selectively engaged with each said engaging projections of said cirucular plate to stably hold the microphone in a desired angular position.

7. A camcorder as claimed in claim 4, wherein a cover is mounted on a top portion of the microphone support piece, and wherein a guide rod of the microphone having a right-angled shape is rotatably disposed between said support piece and said cover.

8. A camcorder as claimed in claim 4, wherein the switching means comprises a contact switch disposed at one side of said support plate to effect a switching operation according to rotational movement of said microphone support piece.

* * * * *